US012126183B2

(12) United States Patent
Forrest et al.

(10) Patent No.: US 12,126,183 B2
(45) Date of Patent: Oct. 22, 2024

(54) MAGNET SHIELDING BY USING A NON-MAGNETIC ELEMENT

(71) Applicant: GN Hearing A/S, Ballerup (DK)

(72) Inventors: Alexander Wildt Forrest, Copenhagen (DK); Emil Holm Knudsen, Copenhagen (DK); Michael Sean James Tanswell, Copenhagen (DK)

(73) Assignee: GN Hearing A/S, Ballerup (DK)

( * ) Notice: Subject to any disclaimer, the term of this patent is extended or adjusted under 35 U.S.C. 154(b) by 293 days.

(21) Appl. No.: 17/529,529

(22) Filed: Nov. 18, 2021

(65) Prior Publication Data
US 2022/0200340 A1 Jun. 23, 2022

(30) Foreign Application Priority Data
Dec. 23, 2020 (DK) .............................. PA202070871

(51) Int. Cl.
*H04R 25/00* (2006.01)
*H01R 13/62* (2006.01)
(Continued)

(52) U.S. Cl.
CPC ........ *H02J 50/005* (2020.01); *H01R 13/6205* (2013.01); *H04R 25/554* (2013.01);
(Continued)

(58) Field of Classification Search
CPC ............. H04R 2225/31; H04R 25/554; H04R 25/602; H04R 1/1016; H04R 1/1025; H02J 50/005; H02J 50/10
(Continued)

(56) References Cited

U.S. PATENT DOCUMENTS

| 2012/0237084 A1 | 9/2012 | De Lemos |
| 2013/0315431 A1 | 11/2013 | Grinker et al. |

(Continued)

FOREIGN PATENT DOCUMENTS

| CN | 209345367 | 9/2019 |
| CN | 110602581 | 12/2019 |

(Continued)

OTHER PUBLICATIONS

Foreign Examination report for Danish patent application No. PA 2020 70871 dated Jun. 4, 2021.
(Continued)

*Primary Examiner* — Phylesha Dabney
(74) *Attorney, Agent, or Firm* — Vista IP Law Group, LLP

(57) ABSTRACT

Disclosed is a system comprising a hearing device and a charging device. The charging device is configured for receiving the hearing device and for charging the hearing device. The hearing device comprises a hearing device magnet and a receiving charging element. The charging device comprises a charging device magnet and a supplying charging element. The hearing device magnet and the charging device magnet are configured for retaining the hearing device in the charging device when charging. The supplying charging element is configured for performing the charging of the hearing device. The system comprises a non-magnetic element provided between the hearing device magnet and the charging device magnet, when the hearing device is received in the charging device.

17 Claims, 3 Drawing Sheets

(51) Int. Cl.
*H02J 50/00* (2016.01)
*H02J 50/10* (2016.01)

(52) U.S. Cl.
CPC ............ *H02J 50/10* (2016.02); *H04R 25/602* (2013.01); *H04R 2225/31* (2013.01)

(58) Field of Classification Search
USPC ........................................................ 381/312
See application file for complete search history.

(56) References Cited

U.S. PATENT DOCUMENTS

| | | | |
|---|---|---|---|
| 2017/0245038 A1 | 8/2017 | Chawan et al. | |
| 2019/0239004 A1* | 8/2019 | Mueller | H04R 25/02 |
| 2019/0386498 A1* | 12/2019 | Higgins | H04R 25/30 |
| 2020/0221208 A1 | 7/2020 | Gu et al. | |
| 2022/0200348 A1* | 6/2022 | Forrest | H04R 1/1016 |

FOREIGN PATENT DOCUMENTS

| | | |
|---|---|---|
| CN | 111464909 | 7/2020 |
| CN | 111641272 | 9/2020 |
| EP | 2441625 A1 | 4/2012 |
| EP | 2677767 A2 | 12/2013 |
| EP | 3151584 A2 | 4/2017 |
| EP | 3151584 A3 | 8/2017 |

OTHER PUBLICATIONS

Extended European Search Report for EP Patent Appln. No. 21212295.6 dated May 13, 2022.
Search Report for EP Patent No. EP 3151584 dated Jun. 27, 2017.

* cited by examiner

MAGNET SHIELDING BY USING A NON-MAGNETIC ELEMENT

RELATED APPLICATION DATA

This application claims priority to, and the benefit of, Danish Patent Application No. PA 2020 70871 filed on Dec. 23, 2020. The entire disclosure of the above application is expressly incorporated by reference herein.

FIELD

The present disclosure relates to a system and chargeable devices forming part of the system and comprising a magnet for holding devices together during charging.

BACKGROUND

Rechargeable hearing aids are gaining popularity because they require low maintenance compared to traditional hearing aids with alkaline batteries. The rechargeable hearing aids do not generate an extra cost for a user, as there is no need for purchasing a new battery every time an old battery is drained. Furthermore, the rechargeable hearing aids have other benefits, they are watertight, robust, environmentally friendly, and allow for new architectures. The rechargeable hearing devices are typically charged wirelessly.

Wireless charging has various advantages, it is simple as a charging device may simply be placed at a charging pad. Furthermore, mechanical strain on a charging port is reduced, as there is no plug to be plugged and unplugged every time. Additionally, wireless charging is constantly growing so it will be more and more common that wireless charging pads will be installed in various places so that users can simply drop their device for charging. This applies to standard devices which do not require special, i.e. custom, types of charging pads.

On the other hand, wireless charging is in general slower than wired charging as, often, a charging device and a charger may not have a good energy transfer due to low efficiency, and especially if the charging device has a special shape, like a hearing device. Due to their specific shape, hearing devices may require a charging station, and not a simple charging pad. Therefore, there is a need for ensuring optimal charging of a hearing device in a charger, while shielding magnet(s) which hold the hearing device in place in the charging system.

SUMMARY

It is an object to provide a hearing device/charger system with an improved attraction force between the hearing device and charger during charging of the hearing device.

It is a further object to provide a hearing device/charger system with magnets shielded from outside impacts.

It is also an object to eliminate any user risk related to coming into contact with magnets of a hearing device/charger system.

It is a further object to provide a hearing device with a reduced size.

It is also an object to provide a corresponding charging device with a reduced size.

It is yet another object to provide a hearing device/charger system with optimized charging capabilities.

In a first aspect, disclosed is a system comprising a hearing device and a charging device. The charging device is configured for receiving the hearing device and for charging the hearing device. The hearing device comprises a hearing device magnet and a receiving charging element. The charging device comprises a charging device magnet and a supplying charging element. The hearing device magnet and the charging device magnet are configured for retaining the hearing device in the charging device when charging. The supplying charging element is configured for performing the charging of the hearing device. The system comprises a non-magnetic element provided between the hearing device magnet and the charging device magnet, when the hearing device is received in the charging device.

The hearing device may be a headset, a hearing aid, an earbud, or similar. The system may comprise two hearing devices having similar features and characteristics. One hearing device may fit the user's right ear and the other may fit the user's left ear. Alternatively, both hearing aids may be formed such to fit both ears of the user. The two hearing devices may be mechanically connected or wirelessly connected to each other or they may be two completely separate devices. The hearing device may be a cordless rechargeable electronic device which may be charged exclusively by the charging device. The charging device represents a charger configured for receiving the hearing device. Namely, the hearing device can be placed in the charger, i.e. a charger case. The charger case would normally form one or two cavities or shells having a negative geometry of the one of the hearing device such that the hearing device(s) can be placed in the formed cavity/cavities. The hearing device may at least partly be received in the charger cavity. The charging device is configured for charging the hearing device. The charger itself may be in a form of a rechargeable battery which charges the hearing device or it may be in the form of a device which charges the hearing device while plugged in an electric socket.

The hearing device comprises a hearing device magnet. The magnet is typically placed in a hearing device housing together with other components of the hearing device such as a printed circuit board, speaker, an antenna, microphone, and similar. Typically, the magnet is placed close to the surface where the hearing device engages with the charger device. The magnet may be covered by the housing material and not exposed to the surroundings. If there are two hearing devices, each device may comprise a magnet. The hearing device may be a square magnet, a cylindrical magnet, ellipsoidal magnet or similar. The shape of the magnet normally depends on the size of the hearing device housing and other components arranged therein. As the rechargeable hearing devices have a small size, there are tight space requirements and there is a constant trend towards miniaturization of all hearing devices components, including the magnet. The magnet may have a diameter in the range of millimeters.

The hearing device also comprises a receiving charging element. The hearing device may comprise two receiving charging elements. The receiving charging element receives electrical charges from the charger which provides electricity to this portable hearing device. The receiving charging element may be configured for conductive charging. The conductive charging uses conductive power transfer. The conductive charging element may be a conductor, and in particular in a form of charging pads. Alternatively, the receiving charging element may be configured for inductive charging and be in a form of an induction coil optionally assisted by a capacitor. In this case, energy is transferred through inductive coupling. If there are two hearing devices in the system, each hearing device comprises the receiving charging element.

Similarly, the charging device comprises a charging device magnet typically placed in the cavity configured for receiving the hearing device. The magnet has its own persistent magnetic field attracting the corresponding magnet in the hearing device. The charging device magnet may have similar diameter as the hearing device magnet. Similar to the hearing device magnet, the charger magnet may be placed at the surface of the charger cavity such as to face the hearing device magnet when the hearing device is placed in the cavity. Placing the two magnets close to each other and aligning them ensures good attraction force between the hearing device and the charger. The charger may comprise two magnets if the system comprises two hearing devices, i.e. one magnet for each hearing device. However, it is also possible that the charger comprises one magnet positioned and sized appropriately to ensure desirable retention of both hearing devices.

The charging device also comprises a supplying charging element. The charging device may comprise two supplying charging elements. The supplying charging element supplies electrical charges to the hearing device, thereby providing electricity to the portable hearing device. Namely, the supplying charging element is configured for performing the charging of the hearing device by connection to the receiving charging element. The supplying charging element may be configured for conductive charging. The supplying charging element may be a conductor, and in particular in a form of a pogo pin or spring-loaded pin. Alternatively, the supplying charging element may be configured for inductive charging and be in a form of an induction coil optionally assisted by a capacitor. In this case energy is transferred through inductive coupling. The supplying charging element and the receiving charging element are configured for the same type of power transfer. If there are two hearing devices in the system, the charging device comprises two supplying charging elements, one for each of the two hearing devices. The supplying charging element is normally aligned with the receiving charging element in order to achieve efficient charging. The supplying charging element may be positioned close to the charging device magnet, and similarly, the receiving charging element may be positioned close to the hearing device magnet.

The hearing device magnet and the charging device magnet are configured for retaining the hearing device in the charging device when charging. In order to maximize the attraction force between the two magnets, the magnets may be placed as close as it is allowed by the geometry of the hearing device and the charger device. Additionally, the magnets may be placed in alignment as much as it is allowed by the geometry of the hearing and charging device. Additionally, the magnets ensure compression of the pogo pins during charging, or, in the case of inductive charging, the retention force generated by the magnets ensure close and tight contact between the hearing device and the charger thereby improving efficiency of the inductive charging.

The system comprises a non-magnetic element. The element is non-magnetic which means that it will not increase or affect the magnetic field between the hearing device magnet and the charger magnet. In addition, those materials which are not attracted by a magnet are called non-magnetic materials. All substances other than iron, nickel, and cobalt may be non-magnetic substances. Non-magnetic substances cannot be magnetized, i.e. they will not induce magnetic properties in other neighboring elements. The non-magnetic element may e.g. be a metal, such as steel, sodium, aluminium, or magnesium; plastic, carbon-fibre, paper, rubber, and/or textile. The non-magnetic element may be a sheet, a thin plate, a foil, a disk, a can etc.

All substances may exhibit some type of magnetism. Magnetic materials are classified according to their bulk susceptibility. Ferromagnetism is responsible for most of the effects of magnetism encountered in everyday life. Paramagnetic substances, such as aluminum and oxygen, are weakly attracted to an applied magnetic field; diamagnetic substances, such as copper and carbon, are weakly repelled; while antiferromagnetic materials, such as chromium and spin glasses, have a more complex relationship with a magnetic field. The force of a magnet on paramagnetic, diamagnetic, and antiferromagnetic materials is usually too weak to be felt and can be detected only by laboratory instruments, so in everyday life, these substances are often described as non-magnetic. Thus, the non-magnetic material may be a paramagnetic, diamagnetic, or antiferromagnetic material.

The non-magnetic element is provided between the hearing device magnet and the charging device magnet, when the hearing device is received in the charging device.

Providing, arranging or locating the non-magnetic element between the hearing device magnet and the charging device magnet provides that the distance between the hearing device magnet and the charger magnet is reduced. There may be no other material between the hearing device magnet and the charger magnet than the non-magnetic element.

It is an advantage that the distance between the magnets of the hearing device and the charger is reduced. The attraction force between the magnets is increased due to the reduced distance between the hearing device magnet and charging device magnet. As the attraction force is increased, the size of at least one of the magnets can be reduced. Reducing the size of the magnet(s) may result in a size reduction of the entire device(s). Alternatively, the distance reduction may provide space in the hearing device and/or in the charger device for bigger magnets, which further increases the attraction force.

It is an advantage that the magnets are shielded by the non-magnetic element. The non-magnetic element does not require additional space for shielding the magnets as it may be arranged to be in a direct contact with the magnets of the hearing device and/or the charging device. The non-magnetic element protects the magnets from outside impacts. The non-magnetic element may also protect the surface of the magnets from wear. The non-magnetic element may also protect the user from direct contact with the magnets which reduces the risk of allergies etc.

The distance between the magnets of the hearing device and the charger is reduced because the non-magnetic element may be thinner than the material which is typically provided between the hearing device magnet and the charging device magnet. The material which is typically or traditionally provided between the hearing device magnet and the charging device magnet is the plastic housing or shell of the hearing device and charger.

The non-magnetic element may e.g. be moulded, inmoulded or press-fitted into the shells or plastic material of the hearing device and/or charger. The distance between the magnets of the hearing device and the charger is reduced, such as minimized, by arranging the non-magnetic element by using methods such as moulding, in-moulding or pressfitting.

In the prior art, magnets are glued to the inside of the plastic housings of the hearing device, e.g. earbud, and charger. There is a limit on how thin the plastic housing can be made when using plastic molding for manufacturing. The limit may be at around 0.3 mm, which means that the magnets will be at a minimum distance of 0.6 mm to each other, when the traditional plastic housing material is provided between the magnets.

Thus, it is an advantage that the non-magnetic element, e.g. a metal plate, can be made really thin and robust. At a metal thickness of 0.1 mm, the minimum distance between the magnets of the hearing device and the charger will be 0.2 mm, and thereby the distance will be lowered approximately 0.4 mm compared to the prior art.

In some embodiments, the non-magnetic element may be provided in the charging device. The non-magnetic element may be in a direct contact with the charging device magnet and arranged towards the hearing device when the hearing device is placed in the charger. Normally, the charging device magnet is protected from outside impacts by a material forming a charging device case. It is normally a molded plastics material. According to some embodiments, the non-magnetic element may be arranged instead of the traditional plastics material for covering the charging magnet. Providing the non-magnetic element instead of the cover material in the charging device, the magnet is still shielded while the distance between the magnets of the hearing device and the charger is not increased. At the same time, the attraction force between the magnets is increased due to the reduced distance between the hearing device magnet and charging device magnet. As the attraction force is increased, the size of at least one of the magnets can be reduced. Reducing the size of the magnet(s) may result in a size reduction of the entire device(s).

In some embodiments, the non-magnetic element may be provided in the hearing device. The non-magnetic element may be in a direct contact with the hearing device magnet and arranged towards the charging device when the hearing device is placed in the charger. Normally, the hearing device magnet is protected from outside impacts by a material forming a housing of the hearing device. It is normally a molded plastics material which, at the same time, protects a hearing device user from the electronic components and the magnet of the hearing device. According to some embodiments, the non-magnetic element may be arranged instead of the traditional plastics material for covering hearing device magnet. Providing the non-magnetic element instead of the cover material in the hearing device, the hearing device magnet is still shielded while the distance between the magnets of the hearing device and the charger is not increased. At the same time, the attraction force between the magnets is increased when the hearing device is placed in the charger due to the reduced distance between the hearing device magnet and charging device magnet. Arranging the non-magnetic element in the hearing device provides the same benefits as when the non-magnetic element is arranged in the charging device.

In some embodiments, the non-magnetic element is made of metal, plastic, carbon-fibre, paper, and/or textile. In principle, the non-magnetic element may be made of any material which is non-magnetic, however the material should be suitable for being placed, such as in-moulded, in a hearing device housing and/or in a charger, it should be thin and be robust.

The non-magnetic material may be a stainless steel, such as an austenitic stainless steel or a ferritic stainless steel. An austenite, also known as gamma-phase iron (γ-Fe), is a metallic, non-magnetic allotrope of iron or a solid solution of iron, with an alloying element.

The non-magnetic material may be a medical grade material which can be used for medical tools with great corrosion resistance properties. A medical grade material may be relevant to use when it comes to hearing aids which normally come in a close contact with the user's skin.

The non-magnetic material may have good stress corrosion cracking resistance and may not be susceptible to stress corrosion cracking, may have good corrosion resistance to numerous substances, such as certain organic acids and nitric acid and may be useful in mildly corrosive conditions. The non-magnetic material may have resistance to heat and oxidation.

In some embodiments, the non-magnetic element has a thickness of less than 0.3 mm. The non-magnetic element may have a thickness of about 0.2 mm or 0.1 mm. The thickness of the non-magnetic element may be smaller than the thickness of the plastic housing, which is typically minimum 0.3 mm when manufactured by moulding.

In some embodiments, the non-magnetic element may have a larger width than the width of the hearing device magnet or the charging device magnet. The non-magnetic element may have a width in the range between 3.1 mm-3.5 mm. Typically, the magnet in the hearing device is about 3.1 mm wide, 2.3 mm deep and 1.5 mm tall, while the charging device magnet is about 3.1-6.2 mm wide, 2.3-4.6 mm deep, and 1.5-5.2 mm tall. The non-magnetic element is typically dimensioned such that it covers the entire surface of the magnet(s).

In some embodiments, the non-magnetic element may be provided between the hearing device magnet and the charging device magnet by arranging the non-magnetic element at a first surface, where the hearing device magnet and the charging device magnet are facing each other. Normally, the magnets of the charging device and the hearing device are aligned with each other so that maximum available magnetic force is exerted on the hearing device when placed in the charger. Such arrangement ensures that the hearing device is retained in the charging device and additionally compression of the charging elements is ensured during charging. The non-magnetic element may therefore be placed at the first surface between the aligned magnets. Thereby, the non-magnetic element is also aligned with the magnets. The first surface may be a surface of the hearing device aligned with the hearing device magnet and exposed to the environment. The first surface may be a surface of the charging device aligned with the charging device magnet and exposed to the environment. The non-magnetic element may cover the entire first surface of the magnet(s). The non-magnetic element may cover only the first surface of the magnet(s) and no other surfaces of the magnet(s). Alternatively, the non-magnetic element may cover both the first surface of the magnet(s) and one or more other surfaces of the magnet(s).

In some embodiments, the non-magnetic element is arranged at a second surface along the side of the hearing device magnet and/or the charging device magnet. The non-magnetic element may be arranged at both the first surface and the second surface. The second surface may be perpendicular to the first surface. The non-magnetic element may cover the entire first surface of the magnet(s). The non-magnetic element may cover the entire second surface of the magnet(s), or the non-magnetic element may cover only a part of the second surface of the magnet(s), such as half of the second surface or one third or one fourth of the second surface of the magnet(s).

In some embodiments, the non-magnetic element may comprise a first non-magnetic element in the charging device and a second non-magnetic element in the hearing device. Namely, one non-magnetic element is arranged in each of the hearing device and charging device. By arranging the non-magnetic element in both devices, the distance between the hearing device and charging device is reduced compared to traditional devices, which will increase the retaining force between the hearing device and charging device. As the retaining force is increased, it is possible to use smaller magnets than what is normally used. Thereby space is saved in both the hearing device and the charger, and the devices can be made smaller or saved space may be used for arranging other components. The first and second non-magnetic elements may have the same size and may be made from the same material, as described above in relation to the non-magnetic element arranged to form part of one of the hearing device and charging device.

In a second aspect, disclosed is a charging device configured for receiving and charging the hearing device. The charging device comprising a charging device magnet and a supplying charging element. The charging device magnet being configured for retaining the hearing device in the charging device when charging. The supplying charging element being configured for performing the charging of the hearing device. The charging device comprises a non-magnetic element. The non-magnetic element is arranged at a first charging device surface, where the charging device magnet faces the hearing device, when the hearing device is received in the charging device.

In a third aspect, disclosed is a hearing device configured to be received and charged by a charging device. The hearing device comprises a hearing device magnet and a receiving charging element. The hearing device magnet being configured for retaining the hearing device in the charging device when charging. The hearing device comprises a non-magnetic element. The non-magnetic element is arranged at a first hearing device surface where the hearing device magnet faces the charging device, when the hearing device is received in the charging device.

In a fourth aspect, disclosed is a method for arranging a non-magnetic element in a system of the first aspect. The method comprises arranging the non-magnetic element at a first surface where the hearing device magnet and the charging device magnet are facing each other. The non-magnetic element is arranged at least partly around at least one of the hearing device magnet and the charging device magnet. The non-magnetic element is on the outside of the magnet and on the outside of the housing of the hearing device and/or charger. There may be no other material, such as moulded plastic material, on the outside of the non-magnetic element. The non-magnetic element may be in direct contact with both the magnet and the other device, i.e charger or hearing device, of the system, when the hearing device is in the charger. The method may comprise arranging a non-magnetic element in a charger of the second aspect. The method may comprise arranging a non-magnetic element in a hearing device of the third aspect. Thus, the non-magnetic element may be provided on the hearing device. The non-magnetic element may be provided on the charger. The non-magnetic element may be provided on both the hearing device and the charger. The hearing device and/or the charger may be manufactured by moulding. Moulding is the process of manufacturing by shaping liquid or pliable raw material using a rigid frame called a mould. The mould is a hollowed-out block that is filled with a liquid or pliable material such as plastic or metal. The liquid hardens or sets inside the mold, adopting its shape.

The material of the housing may be a molded plastics material which forms the charger device and/or hearing device. The housing material may not disturb the magnetic field between the magnets. Similar to the non-magnetic element plate, the housing material may be selected to have high resilience and toughness as well as to be biologically compatible and with low general reactiveness.

In some embodiments of the method, arranging the non-magnetic element is performed by press-fitting, in-moulding, and/or by gluing. The non-magnetic material is arranged in the housing of the hearing device and/or the housing of the charger. The non-magnetic element may be arranged e.g. by in-moulding during the same moulding process of moulding the plastic housing. The non-magnetic element may be arranged e.g. by press-fitting the non-magnetic element into the housing, after the housing has been manufactured, e.g. by moulding. The non-magnetic element may be arranged e.g. by gluing the non-magnetic element on the housing, after the housing has been manufactured, e.g. by moulding. The non-magnetic element may be arranged e.g. by melting in, by ultrasonic or heat, the non-magnetic element on the housing, after the housing has been manufactured, e.g. by moulding.

The present disclosure relates to different aspects including the system described above and in the following, and corresponding system parts, i.e. the hearing device and charging devices each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
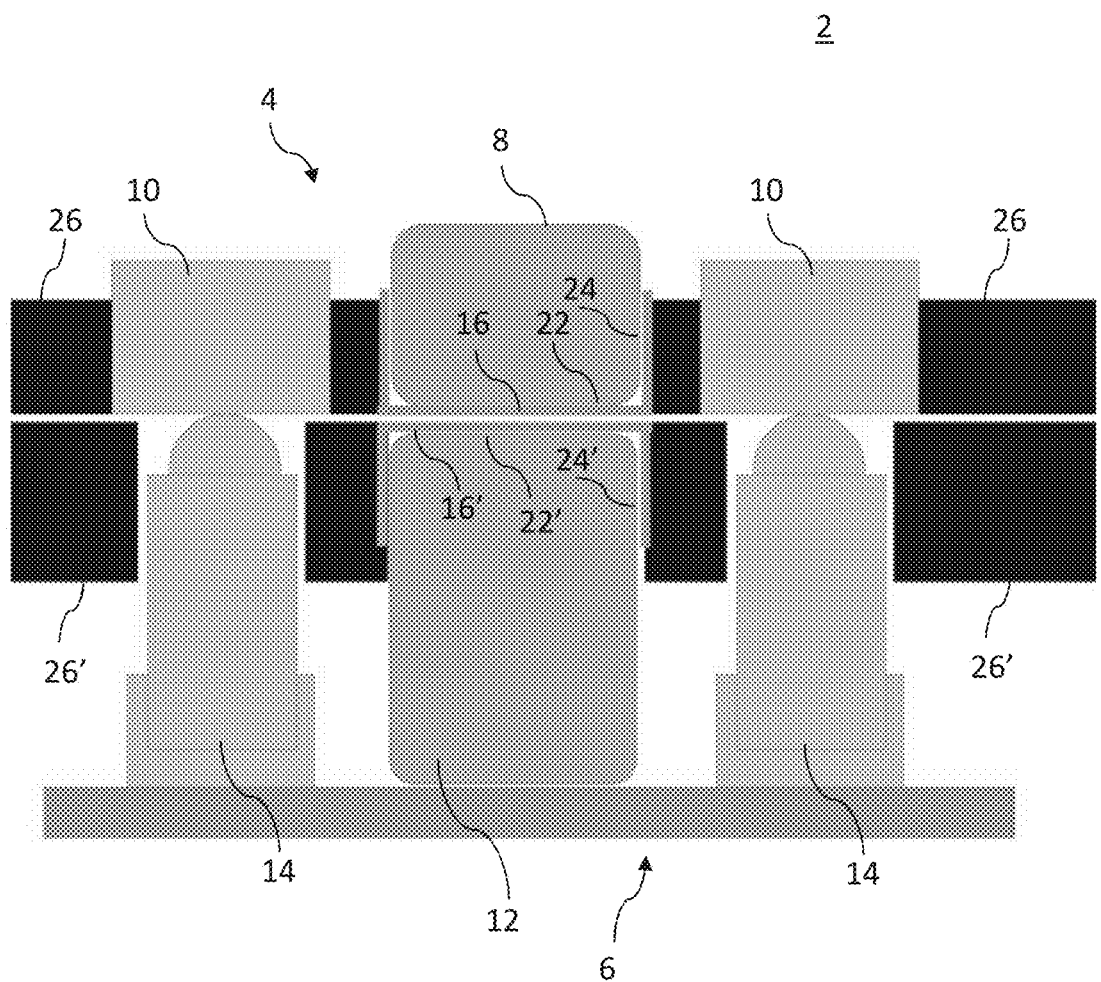
FIG. 1 schematically illustrates an exemplary embodiment of a system comprising a hearing device and a charging device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 schematically illustrates an exemplary embodiment of a system 2 comprising a hearing device 4 and a charging device 6. The charging device 6 is configured for receiving the hearing device 4 and for charging the hearing device 4. The hearing device 4 comprises a hearing device magnet 8 and a receiving charging element 10, such as two receiving charging elements 10. The charging device 6 comprises a charging device magnet 12 and a supplying charging element 14, such as two supplying charging elements 14. The hearing device magnet 8 and the charging device magnet 12 are configured for retaining the hearing device 4 in the charging device 6 when charging. The supplying charging element 14 is configured for performing the charging of the hearing device 4. The system 2 comprises a non-magnetic element 16, 16' provided between the hearing device magnet 8 and the charging device magnet 12, when the hearing device 4 is received in the charging device 6. In this schematic illustration of the system, the non-magnetic element 16 is forming part of the hearing device 4 and is arranged at a surface of the hearing device 4 facing the charging device 6. In this schematic illustration of the system, the non-magnetic element 16' is forming part of the charging device 6 and is arranged at a surface of the charging device 6 facing the hearing device 4.

The non-magnetic elements 16, 16' are provided between the hearing device magnet 8 and the charging device magnet 12 by arranging the non-magnetic elements 16, 16' at first surfaces 22, 22' where the hearing device magnet 8 and the charging device magnet 12 are facing each other. The non-magnetic element 16 covers the first surface 22 of the hearing device magnet 8. The non-magnetic element 16 is also arranged at a second surface 24 along the side of the hearing device magnet 8. The non-magnetic element 16' covers the first surface 22' of the charging device magnet 12. The non-magnetic element 16' is also arranged at a second surface 24' of the charging device magnet 12. The non-magnetic elements 16, 16' are arranged at both the first surfaces 22, 22' and the second surfaces 24, 24'. The second surfaces 24, 24' may be perpendicular to the first surfaces 22, 22'. The non-magnetic elements 16, 16' covers the entire first surface 22, 22' of the magnets 8, 12. The non-magnetic element 16, 16' covers a part of the second surfaces 24, 24' of the magnets 8, 12. Alternatively, the non-magnetic elements 16, 16' may cover the entire second surfaces of the magnets.

The non-magnetic elements 16, 16' are arranged in the plastic housings 26, 26' of the hearing device 4 and the charging device 6.

Figure 2:
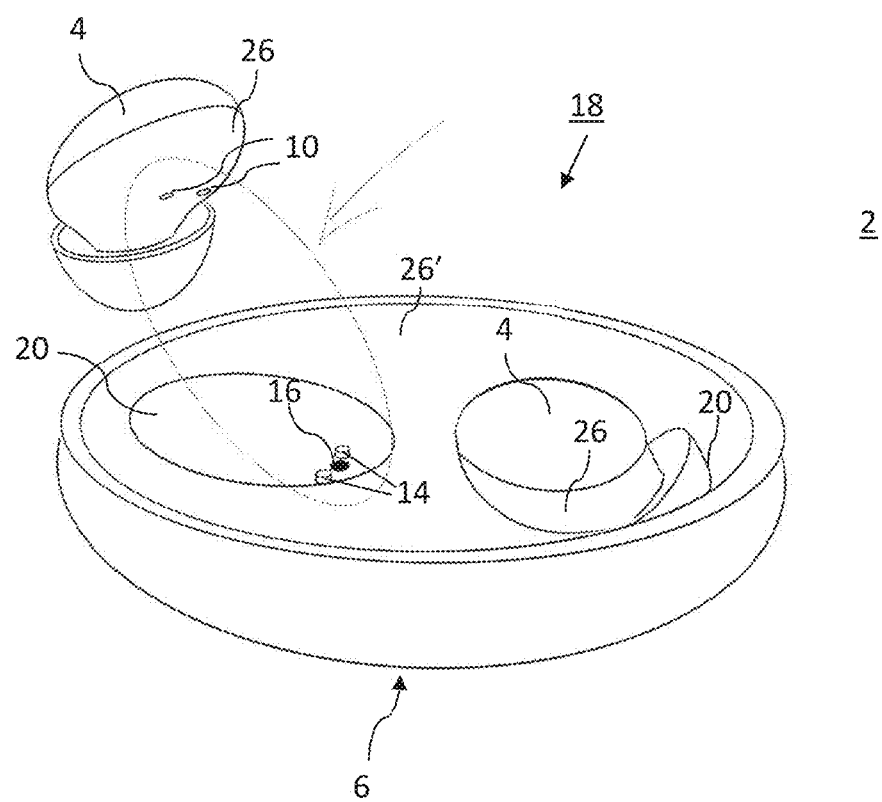
FIG. 2 schematically illustrates an exemplary embodiment of a system comprising a first and second hearing device, and a charging device.

FIG. 2 schematically illustrates an exemplary embodiment of a system 2, 18 comprising a first and second hearing device 4. FIG. 2 illustrates cavities 20 formed in the charging device 6 shaped to receive at least part of the hearing devices 4. In this embodiment, the charging device 6, i.e. the cavity 20 comprises a non-magnetic element 16' arranged such to be aligned with the magnets of the hearing device and the charging device (not visible). The cavity 20 also comprises a supplying charging elements 14 arranged on the sides of the magnet for connection with the receiving charging elements 10 of the hearing device 4. The other cavity 20 may comprise the same features as the described cavity 20.

The non-magnetic elements 16, 16' are arranged in the plastic housings 26, 26' of the hearing device 4 and the charging device 6.

Figure 3:
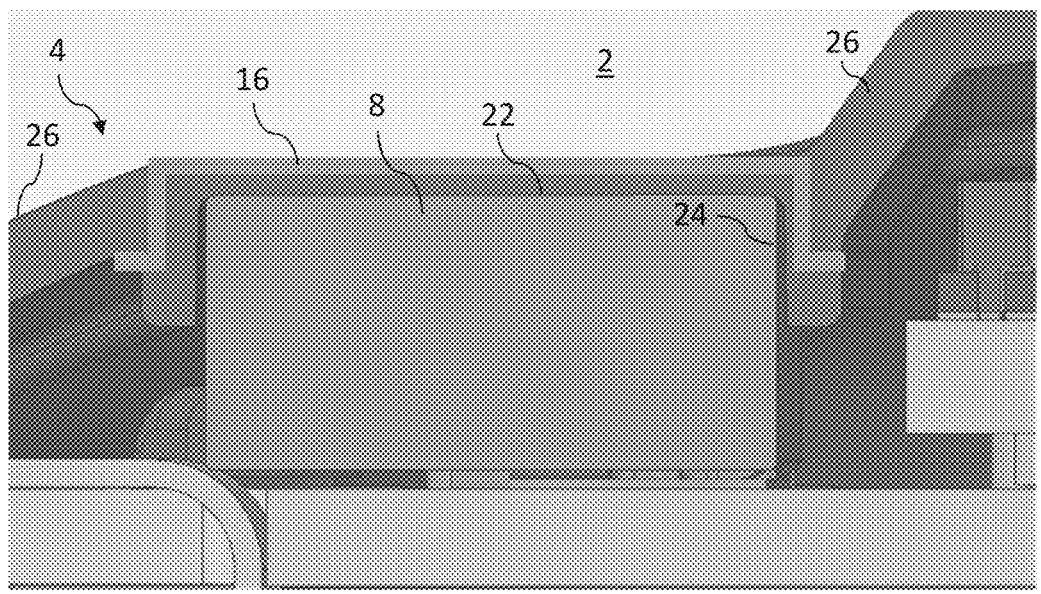
FIG. 3 schematically illustrates an exemplary embodiment of a system comprising a hearing device.

FIG. 3 schematically illustrates an exemplary embodiment of a system 2 comprising a hearing device 4 and a charging device (not shown). The charging device is configured for receiving the hearing device 4 and for charging the hearing device 4. The hearing device 4 comprises a hearing device magnet 8 and a receiving charging element (not shown). The charging device comprises a charging device magnet and a supplying charging element. The hearing device magnet 8 and the charging device magnet are configured for retaining the hearing device 4 in the charging device when charging. The supplying charging element is configured for performing the charging of the hearing device 4. The hearing device 4 comprises a non-magnetic element 16 provided between the hearing device magnet 8 and the charging device magnet, when the hearing device 4 is received in the charging device. In this schematic illustration of the system, the non-magnetic element 16 is forming part of the hearing device 4 and is arranged at a surface of the hearing device 4 facing the charging device.

The non-magnetic element 16 is provided between the hearing device magnet 8 and the charging device magnet by arranging the non-magnetic element 16 at a first surface 22, where the hearing device magnet 8 and the charging device magnet are facing each other. The non-magnetic element 16 covers the first surface 22 of the hearing device magnet 8. The non-magnetic element 16 is also arranged at a second surface 24 along the side of the hearing device magnet 8. The non-magnetic element 16 is arranged at both the first surface 22 and the second surface 24. The second surface 24 may be perpendicular to the first surface 22. The non-magnetic element 16 covers the entire first surface 22 of the hearing device magnet. The non-magnetic element 16 covers a part of the second surface 24 of the hearing device magnet 8. Alternatively, the non-magnetic element 16 may cover the entire second surface of the magnet.

The non-magnetic element 16 is arranged in the plastic housing 26 of the hearing device 4.

As an alternative, the charging device comprises a non-magnetic element provided between the hearing device magnet and the charging device magnet, when the hearing device is received in the charging device. In this alternative, the non-magnetic element is then forming part of the charging device and is arranged at a surface of the charging device facing the hearing device.

Figure 4:
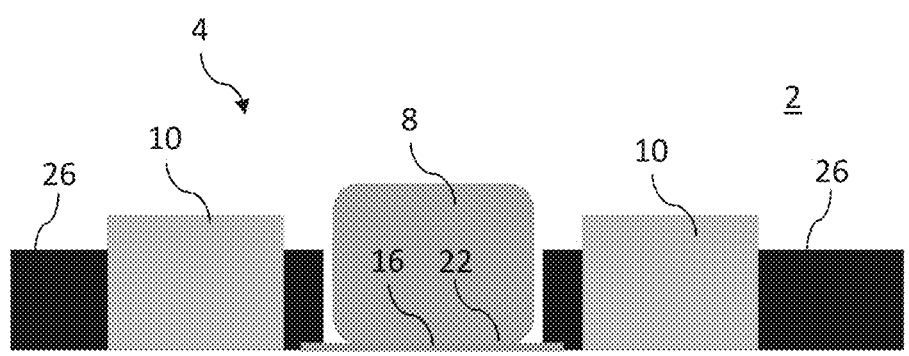
FIG. 4 schematically illustrates an exemplary embodiment of a system comprising a hearing device.

FIG. 4 schematically illustrates an exemplary embodiment of a system 2 comprising a hearing device 4 and a charging device (not shown). The charging device is configured for receiving the hearing device 4 and for charging the hearing device 4. The hearing device 4 comprises a hearing device magnet 8 and a receiving charging elements 10. The charging device comprises a charging device magnet and a supplying charging element. The hearing device magnet 8 and the charging device magnet are configured for retaining the hearing device 4 in the charging device when charging. The supplying charging element is configured for performing the charging of the hearing device 4. The hearing device 4 comprises a non-magnetic element 16 provided between the hearing device magnet 8 and the charging device magnet, when the hearing device 4 is received in the charging device. In this schematic illustration of the system, the non-magnetic element 16 is forming part of the hearing device 4 and is arranged at a surface of the hearing device 4 facing the charging device.

The non-magnetic element 16 is provided between the hearing device magnet 8 and the charging device magnet by arranging the non-magnetic element 16 at a first surface 22, where the hearing device magnet 8 and the charging device magnet are facing each other. The non-magnetic element 16 covers only the first surface 22 of the magnet 8 in FIG. 4 and no other surfaces of the magnet 8. Alternatively, the non-magnetic element 16 may cover both the first surface 22 of the magnet 8 and one or more other surfaces, such as a second surface, of the magnet(s) as seen in FIG. 1 and FIG. 3.

The non-magnetic element 16 is arranged in the plastic housing 26 of the hearing device 4.

As an alternative, the charging device comprises a non-magnetic element provided between the hearing device magnet and the charging device magnet, when the hearing device is received in the charging device. In this alternative, the non-magnetic element is then forming part of the charging device and is arranged at a surface of the charging device facing the hearing device.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:
1. A system comprising a hearing device and a charging device, the charging device is configured for receiving the hearing device and for charging the hearing device, the hearing device comprises a hearing device magnet and a receiving charging element, the charging device comprises a charging device magnet and a supplying charging element; the hearing device magnet and the charging device magnet are configured for retaining the hearing device in the charging device when charging, the supplying charging element is configured for performing the charging of the hearing device; wherein the system comprises a non-magnetic element provided between the hearing device magnet and the charging device magnet, when the hearing device is received in the charging device.
2. The system according to item 1, wherein the non-magnetic element is provided in the charging device.
3. The system according to item 1, wherein the non-magnetic element is provided in the hearing device.
4. The system according to any of the preceding items, wherein the non-magnetic element is made of metal, plastic, carbon-fibre, paper, and/or textile.
5. The system according to any of the preceding items, wherein the non-magnetic element has a thickness of less than 0.3 mm.
6. The system according to any of the preceding items, wherein the non-magnetic element is provided between the hearing device magnet and the charging device magnet by arranging the non-magnetic element at a first surface where the hearing device magnet and the charging device magnet are facing each other.
7. The system according to any of the preceding items, wherein the non-magnetic element is arranged at a second surface along the side of the hearing device magnet and/or the charging device magnet.
8. The system according to any of the preceding items, wherein the non-magnetic element comprises a first non-magnetic element in the charging device and a second non-magnetic element in the hearing device.
9. A charging device configured for receiving and charging the hearing device, the charging device comprising a charging device magnet and a supplying charging element;
the charging device magnet being configured for retaining the hearing device in the charging device when charging,
the supplying charging element being configured for performing the charging of the hearing device;
wherein the charging device comprises a non-magnetic element, and
wherein the non-magnetic element is arranged at a first surface where the charging device magnet faces the hearing device, when the hearing device is received in the charging device.
10. A hearing device configured to be received and charged by a charging device,
the hearing device comprises a hearing device magnet and a receiving charging element,
the hearing device magnet being configured for retaining the hearing device in the charging device when charging,
wherein the hearing device comprises a non-magnetic element, and
wherein the non-magnetic element is arranged at a first surface where the hearing device magnet faces the charging device, when the hearing device is received in the charging device.
11. A method for arranging a non-magnetic element in a system of item 1, the method comprises:
arranging the non-magnetic element at a first surface where the hearing device magnet and the charging device magnet are facing each other, and
wherein the non-magnetic element is arranged at least partly around at least one of the hearing device magnet and the charging device magnet.
12. The method according to the preceding item, wherein arranging the non-magnetic element is performed by press-fitting, in-moulding, and/or by gluing.

LIST OF REFERENCES 2 hearing device/charger system
4 hearing device
6 charging device
8 hearing device magnet
10 receiving charging device
12 charging device magnet
14 supplying charging element
16 non-magnetic element of hearing device
16' non-magnetic element of charging device
18 system with two hearing devices and a charger
20 charger cavity
22 first surface of hearing device magnet
22' first surface of charging device magnet
24 second surface of hearing device magnet
24' second surface of charging device magnet
26 housing of hearing device
26' housing of charging device

The invention claimed is:
1. A system comprising:
a hearing device; and
a charging device configured for receiving the hearing device and for charging the hearing device;
wherein the hearing device comprises a hearing device magnet and a receiving charging element;
wherein the charging device comprises a charging device magnet and a supplying charging element;
wherein the hearing device magnet and the charging device magnet are configured to retain the hearing device with respect to the charging device;

wherein the supplying charging element is configured to provide power for charging the hearing device;

wherein the system further comprises a non-magnetic element, and wherein at least a part of the non-magnetic element is located between the hearing device magnet and the charging device magnet, when the hearing device is received by the charging device; and wherein the non-magnetic element has a thickness of less than 0.3 mm.

2. The system according to claim 1, wherein the at least a part of the non-magnetic element is a part of the charging device.

3. The system according to claim 1, wherein the at least a part of the non-magnetic element is a part of the hearing device.

4. The system according to claim 1, wherein the non-magnetic element is made of metal, plastic, carbon-fibre, paper, and/or textile.

5. The system according to claim 1, wherein the at least a part of the non-magnetic element has a first surface covering the hearing device magnet or the charging device magnet.

6. The system according to claim 5, wherein the non-magnetic element has a second surface along a side of the hearing device magnet or a side of the charging device magnet.

7. The system according to claim 1, wherein the non-magnetic element comprises a first non-magnetic part coupled to the charging device, and a second non-magnetic part coupled to the hearing device.

8. A charging device for receiving and charging a hearing device, the charging device comprising:
   a magnet; and
   a charging element;
   wherein the magnet is configured to retain the hearing device with respect to the charging device;
   wherein the charging element is configured to provide power for charging the hearing device;
   wherein the charging device further comprises a non-magnetic element, wherein at least a part of the non-magnetic element is between the magnet and a part of the hearing device when the hearing device is received by the charging device; and
   wherein the non-magnetic element has a thickness of less than 0.3 mm.

9. The charging device according to claim 8, wherein the non-magnetic element is made of metal, plastic, carbon-fibre, paper, and/or textile.

10. The charging device according to claim 8, wherein the at least a part of the non-magnetic element has a first surface covering the magnet.

11. The charging device according to claim 10, wherein the non-magnetic element has a second surface along a side of the magnet.

12. The charging device according to claim 10, further comprising a housing, wherein the first surface of the non-magnetic element is aligned or corresponds with a surface of the housing of the charging device.

13. A hearing device configured to be received and charged by a charging device, the hearing device comprising:
   a magnet; and
   a receiving element configured to receive charging power from the charging device;
   wherein the magnet is configured to retain the hearing device with respect to the charging device;
   wherein the hearing device also comprises a non-magnetic element, wherein at least a part of the non-magnetic element is between the magnet and a part of the charging device when the hearing device is received by the charging device; and
   wherein the non-magnetic element has a thickness of less than 0.3 mm.

14. The hearing device according to claim 13, wherein the non-magnetic element is made of metal, plastic, carbon-fibre, paper, and/or textile.

15. The hearing device according to claim 13, wherein the at least a part of the non-magnetic element has a first surface covering the magnet.

16. The hearing device according to claim 15, wherein the non-magnetic element has a second surface along a side of the magnet.

17. The hearing device according to claim 15, further comprising a housing, wherein the first surface of the non-magnetic element is aligned or corresponds with a surface of the housing of the hearing device.

* * * * *